United States Patent
Cook et al.

(10) Patent No.: US 9,482,554 B2
(45) Date of Patent: Nov. 1, 2016

(54) GYROSCOPE STABILIZER FILTER

(71) Applicant: HILLCREST LABORATORIES, INC., Rockville, MD (US)

(72) Inventors: Bryan A. Cook, Silver Spring, MD (US); Yun Li, Clarksburg, MD (US); Matthew G. Liberty, Olney, MD (US)

(73) Assignee: HILLCREST LABORATORIES, INC., Rockville, MD (US)

(*) Notice: Subject to any disclaimer, the term of this patent is extended or adjusted under 35 U.S.C. 154(b) by 507 days.

(21) Appl. No.: 14/266,134

(22) Filed: Apr. 30, 2014

(65) Prior Publication Data

US 2015/0226578 A1   Aug. 13, 2015

Related U.S. Application Data

(60) Provisional application No. 61/818,498, filed on May 2, 2013.

(51) Int. Cl.
*G06F 3/038* (2013.01)
*G01C 19/5776* (2012.01)
*G01C 25/00* (2006.01)

(52) U.S. Cl.
CPC ......... *G01C 25/005* (2013.01); *G01C 19/5776* (2013.01)

(58) Field of Classification Search
CPC .............. G06F 3/0383; G06F 19/00; G06F 2200/1637; G06F 17/00
See application file for complete search history.

(56) References Cited

U.S. PATENT DOCUMENTS

| | | | | |
|---|---|---|---|---|
| 6,466,831 B1* | 10/2002 | Shibata | ............... | G06F 3/0346 345/163 |
| 7,158,118 B2* | 1/2007 | Liberty | ............... | G06F 3/017 345/156 |
| 7,262,760 B2 | 8/2007 | Liberty | | |
| 7,414,611 B2 | 8/2008 | Liberty | | |
| 2004/0239626 A1* | 12/2004 | Noguera | ............... | G06F 1/1626 345/158 |
| 2005/0131602 A1* | 6/2005 | Souda | ............... | B60R 21/01 701/29.7 |
| 2005/0212767 A1* | 9/2005 | Marvit | ............... | G06F 1/1626 345/158 |
| 2005/0243062 A1* | 11/2005 | Liberty | ............... | G06F 3/017 345/158 |
| 2005/0253806 A1* | 11/2005 | Liberty | ............... | G06F 1/3215 345/156 |
| 2006/0092133 A1* | 5/2006 | Touma | ............... | G06F 3/0346 345/158 |
| 2008/0291163 A1* | 11/2008 | Liberty | ............... | G06F 3/017 345/156 |
| 2009/0033807 A1* | 2/2009 | Sheng | ............... | H04N 5/4403 348/734 |
| 2011/0095979 A1* | 4/2011 | Sheng | ............... | H04N 5/4403 345/158 |
| 2011/0307213 A1* | 12/2011 | Zhao | ............... | G01C 17/30 702/153 |
| 2013/0169539 A1* | 7/2013 | Sheng | ............... | H04N 5/4403 345/163 |
| 2013/0249791 A1* | 9/2013 | Pryor | ............... | G06F 3/042 345/156 |
| 2013/0261902 A1* | 10/2013 | Zhdanov | ............... | E02F 3/7613 701/50 |

FOREIGN PATENT DOCUMENTS

WO   2012/044964 A2   4/2012

* cited by examiner

*Primary Examiner* — David A Rogers
(74) *Attorney, Agent, or Firm* — Patent Portfolio Builders PLLC

(57) ABSTRACT

A method, a filtering module, and a computer-readable medium are configured to filter measurements acquired in a sensor reference system. Filtered measurements of motion sensors and a magnetometer attached to the device may then be used to determine orientation of a device in a non-inertial reference system. The measurements are filtered in a reference system, whose position relative to the sensor system can be calculated, and in which gravity and Earth's magnetic field have substantially constant direction and magnitude during the filtering window.

18 Claims, 5 Drawing Sheets

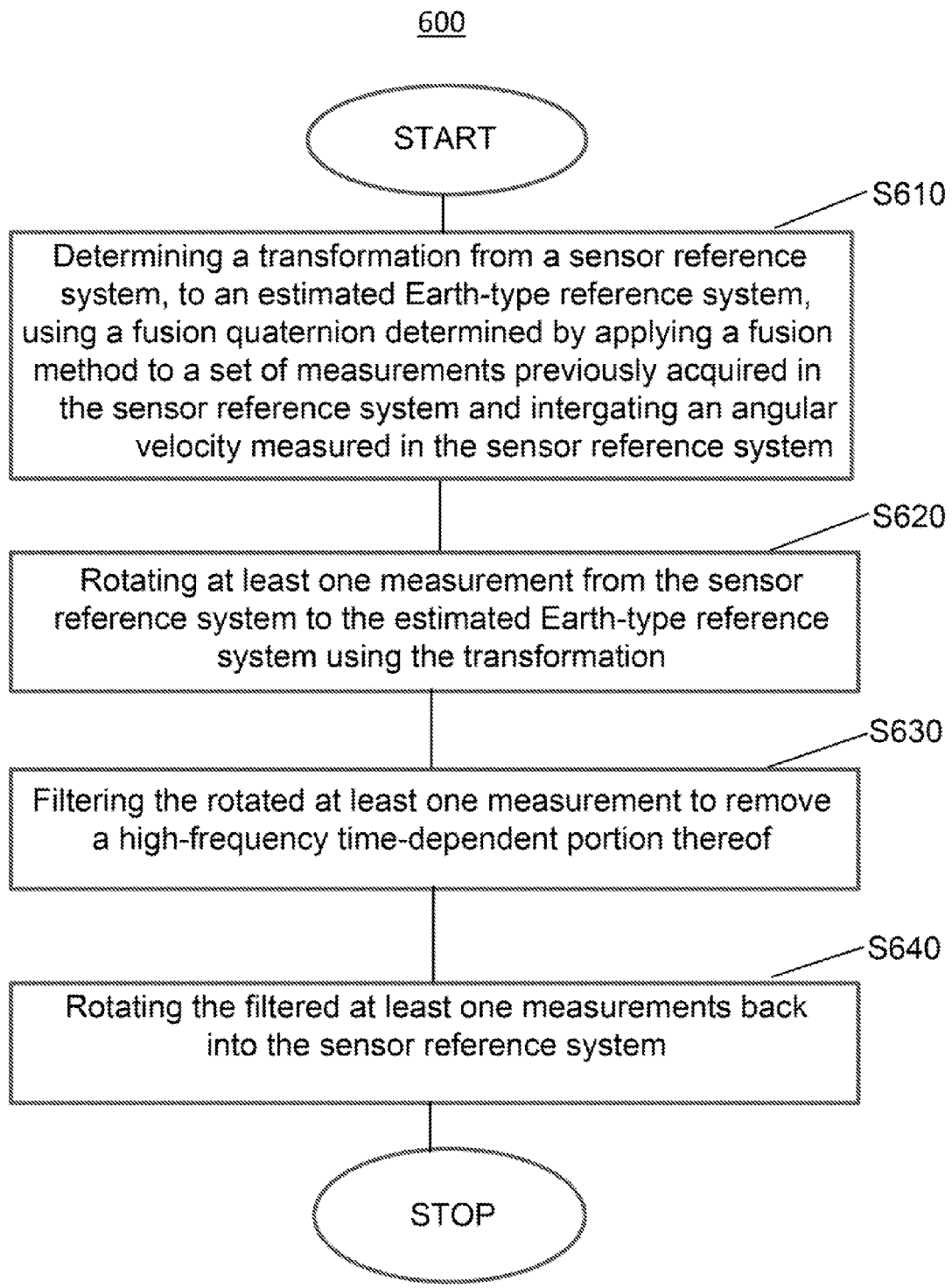

GYROSCOPE STABILIZER FILTER

TECHNICAL FIELD

The present inventions generally relate to methods and devices for filtering measurements acquired in a sensor reference system.

BACKGROUND

As described in WO 2012/044964, which is incorporated herein by reference in its entirety, "sensor fusion" is a term covering methods that determine the angular position of a device in an Earth-type reference system based on measurements of a magnetometer and motion sensors attached to the device.

An Earth-type reference system is a frame in which gravity and Earth's magnetic field have fixed known directions. For example, Earth frame, which is defined as having its x-axis pointing north and its z-axis pointing down in gravity's direction (thereby its y-axis pointing east), is an Earth-type reference system.

A sensor reference system is a frame whose axes are defined relative to the rigid body of a device on which the sensors are mounted. Since the device is changing its position and orientation, gravity and Earth's magnetic field do not have fixed and/or known directions in the sensor reference system. The angular position (orientation) of the device in a target (e.g., Earth-type) reference system determines a transformation (i.e., rotations) from the sensor reference system into the target reference system.

Conventionally, sensor measurements are acquired and then filtered in the sensor reference system to remove jitter (insignificant fluctuations) and to separate time-dependent portions from stable portions thereof (e.g., to separate linear acceleration from gravity). That is, since the sensor fusion's goal is to determine a device's orientation and not a device's position, the focus is on extracting time-independent gravity from the accelerometer signal and not on time-dependent linear acceleration other than gravity. However, filtering sensor measurements in the sensor reference system leads to very poor results when the device (and thus the sensor reference system) is moving and changing its angular position.

A superior sensor fusion result would be achieved if the sensor measurements were filtered in the Earth-type reference system, where gravity and magnetic field directions are known. In this case, a filtered accelerometer measurement would match gravity, and a filtered magnetometer measurement would match the Earth's magnetic field. Since portions of the measurements (i.e., linear acceleration from the accelerometer signal and magnetic interference effects from the magnetometer signal) filtered out vary over time and depend on the device's motion, a low-frequency pass filter could be used to remove these portions of the sensor signals transformed in the Earth-type reference system, while keeping the desired (time-invariant or low-frequency varying) portions. However, since the angular position of the sensor reference system with respect to the Earth-type reference system is not known, the measurement cannot be transformed from the sensor reference system in the Earth-type reference system. Therefore, this ideal manner of filtering signals (i.e., in the Earth-type reference system) cannot be implemented.

Accordingly, it is desirable to provide methods for filtering sensor signals in a reference system whose position relative to the sensor reference system is known and in which the advantages of filtering in an Earth-type reference system are preserved.

SUMMARY

Method and devices according to various embodiments perform filtering of sensor signals in a reference system (gyroscope reference system) different from the sensor reference system. In this gyroscope reference system, time-invariant portions of sensor signals can be separated from time-varying portions thereof more reliably than in the sensor reference system because gravity and Earth's magnetic field directions are fixed within the filtering window. One or more measurements are rotated in the gyroscope reference system, then filtered, and then rotated back into the sensor reference system. If the measurements were associated with acceleration or magnetic field, the filtered and rotated back measurements may be used as inputs to a sensor fusion method to determine the device's orientation in a non-inertial (Earth-type) reference system. The title "gyroscope stabilizer filter" indicates that filtering measurements in the gyroscope reference system has a stabilizing effect, for example, for the sensor fusion output. Sensor fusion with a gyroscope stabilizer filter yields better results than sensor fusion using conventional filtering in the sensor's reference system, because sensor fusion receives more accurate inputs.

According to one embodiment, there is a method for filtering a measurement acquired in a sensor reference system. The method includes determining a transformation from a sensor reference system to a gyroscope reference system using a previous angular position of the gyroscope reference system in the sensor reference system, and an angular velocity measured in the sensor reference system. The method further includes rotating at least one measurement from the sensor reference system to the gyroscope reference system using the transformation. The method also includes filtering the rotated at least one measurement to remove at least a high-frequency time-dependent portion thereof. The method then includes rotating the filtered at least one measurement back into the sensor reference system.

According to another embodiment, there is a computer-readable medium storing executable codes which when performed by a computer make the computer perform a method for filtering a measurement acquired in a sensor reference system. The method includes determining a transformation from a sensor reference system to a gyroscope reference system using a previous angular position of the gyroscope reference system in the sensor reference system, and an angular velocity measured in the sensor reference system. The method further includes rotating at least one measurement from the sensor reference system to the gyroscope reference system using the transformation. The method also includes filtering the rotated at least one measurement to remove at least a high-frequency time-dependent portion thereof. The method then includes rotating the filtered at least one measurement back into the sensor reference system.

According to yet another embodiment, there is a filtering module including a first input, a second input, an integration unit, a first rotation unit, a filter and a second rotation unit. The first input is configured to receive a current value of an angular velocity of a device. The second input is configured to receive a measurement of acceleration or a magnetic field from sensors mounted on the device. The integration unit is configured to receive the angular velocity and to determine a transformation to be applied to the received measurement. The first rotation unit is configured to receive the transformation and to apply the transformation to the received measurement. The filter is configured to modify the transformed measurement, so that the modified measurement corresponds to a substantially time-independent portion. The second rotation unit is configured to receive the transformation, to apply an inverse of the transformation to the modified measurement and to output a result thereof.

According to another embodiment, there is a method for filtering a measurement acquired in a sensor reference system. The method includes determining a transformation from a sensor reference system to an estimated Earth-type reference system using a fusion quaternion determined by applying a fusion method to a set of measurements previously acquired in the sensor reference system and integrating an angular velocity measured in the sensor reference system. The method further includes rotating at least one measurement from the sensor reference system to the estimated Earth-type reference system using the transformation. The method also includes filtering the rotated at least one measurement to remove a high-frequency time-dependent portion thereof, and rotating the filtered at least one measurement back into the sensor reference system.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a flowchart of a method for filtering a measurement acquired in a sensor reference system, according to another embodiment.

DETAILED DESCRIPTION

The following description of the exemplary embodiments refers to the accompanying drawings. The same reference numbers in different drawings identify the same or similar elements. The following detailed description does not limit the invention. The following embodiments are discussed, for simplicity, with regard to the terminology of sensor fusion methods in which a magnetometer and motion sensors are used to determine angular position of a device carrying them.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Motion sensors attached to a device (e.g., a hand-held controller) measure motion-related quantities (e.g., angular velocity, acceleration) in a sensor reference system defined relative to the device's rigid body. The measured acceleration includes gravity and 3D linear acceleration. The magnetic field measured by a magnetometer attached to the device (i.e., in the sensor's reference system) includes Earth's magnetic field, other fields and/or interference effects.

Figure 1:
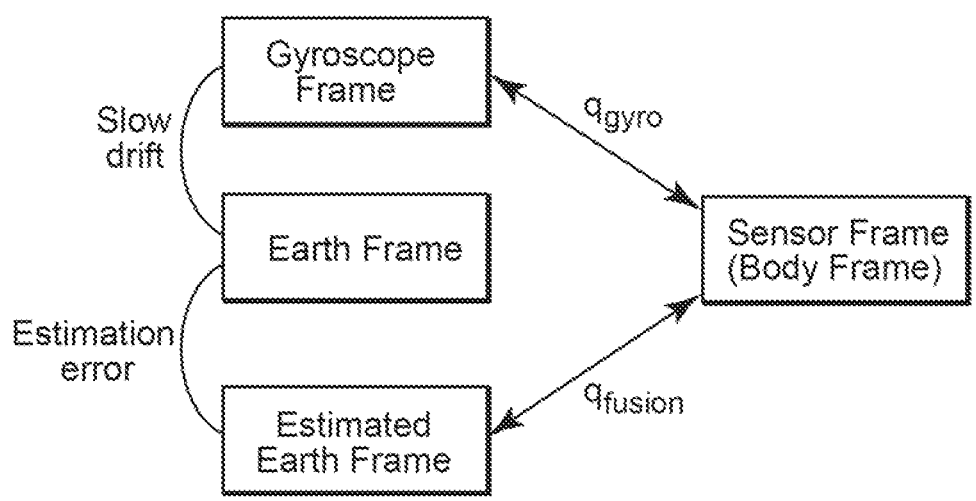
FIG. 1 illustrates reference systems and transitions therebetween according to an embodiment.

FIG. 1 illustrates reference systems and transitions therebetween:
- an Earth-type reference system (for simplicity, labeled "Earth Frame," but this label is not limiting its axis definitions to x-axis pointing north and z-axis pointing down in gravity's direction),
- a reference system that approximates the Earth-type reference system (labeled "Estimated Earth Frame"),
- a sensor reference system (labeled "Sensor Frame") defined relative to the device's rigid body; and
- a reference system (labeled "Gyroscope Frame") in which measurement filtering is performed according to various embodiments.

The transition from one reference system to another includes one or more rotations corresponding to the angular position of one reference system relative to the other reference system. The angular position may be expressed in different ways, the most commonly used being Euler angles, rotation matrices, or a quaternion. In this document, the angular position of the device is expressed using a quaternion, but this manner of expressing angular positions should not be construed as a limitation. Thus, to convert (i.e., rotate) a measurement from one reference system to another reference system, it is enough to know a quaternion representing the angular position of one reference system relative to the other reference system.

Sensors (e.g., an accelerometer, a gyroscope, a magnetometer) attached to the device acquire measurements in the sensor reference system. Conversion from the sensor reference system to the Earth-type reference system would require knowledge of a quaternion $q_{truth}$, which is not known. The sensor fusion method described in WO 2012/044964 uses sensor measurements to determine a fusion quaternion $q_{fusion}$, which enables conversion from the sensor reference system to the reference system that is close to the Earth-type reference system. This reference system that approximates the Earth-type reference system differs from the actual Earth-type reference system due to estimation error.

A reference system used for signal filtering is called "gyroscope reference system" because angular velocity often measured using a gyroscope is used to determine a transformation from the sensor reference system to this reference system. However, the word "gyroscope" is merely a label and does not imply that the angular velocity has to be measured using a gyroscope or any other similar limitation.

The gyroscope reference system is similar to the actual Earth-type reference system in that the gravity and Earth's magnetic field directions are substantially constant within the filtering window, but it differs from the Earth-type reference system because the gravity and Earth's magnetic field directions are not known. The advantage of this gyroscope reference system is that the quaternion $q_{gyro}$ representing the current angular position between the sensor reference system and the gyroscope reference system can be calculated by integrating the angular velocity starting from the previous angular position. An initial angular position may be arbitrarily chosen, for example, the gyroscope reference system may coincide with the sensor reference system at an initial instance.

If the angular velocity measurement and the integration were error-free, then the gravity and Earth's magnetic field directions in the gyroscope reference system would be time-independent. However, even if, in practice finding a current angular position is not error-free making the gyroscope reference system to drift relative to the actual Earth-type reference frame, such a drift is slow or small so that the gravity and Earth's magnetic field directions in the gyroscope reference system may be considered as being "fixed" (time-invariant) within the filtering window. Therefore, the time-independent portion of the measurement corresponding to gravity or Earth's magnetic field can be better separated in this gyroscope reference system than in the sensor reference frame, which makes filtering in the gyroscope reference system to provide a similar advantage to filtering in the Earth-type reference frame.

Figure 2:
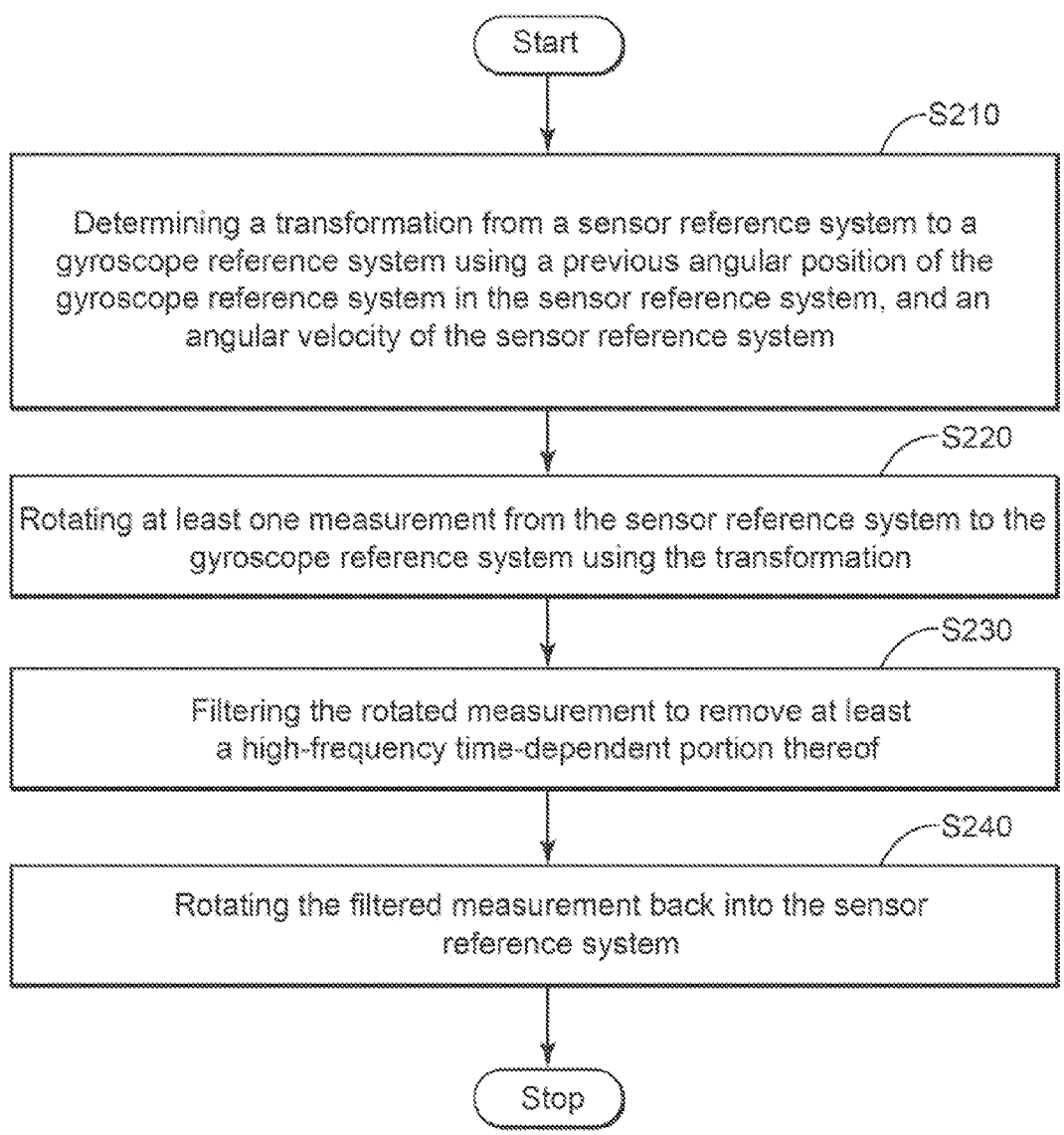
FIG. 2 is a flowchart of a method for filtering a measurement acquired in a sensor reference system, according to an embodiment.

FIG. 2 is a flow diagram of a method 200 for filtering a measurement acquired in a sensor reference system according to an embodiment. Method 200 includes, at S210, determining a transformation from a sensor reference system to a gyroscope reference system using a previous angular position of the gyroscope reference system in the sensor reference system, and an angular velocity measured in the sensor reference system. The angular velocity may be measured by a 3D gyroscope. If quaternion $q_{g,n-1}$ is the previous angular position and $\omega_n$ is the angular velocity, then quaternion $q_{g,n}$ corresponding to the current angular position is:

$$q_{g,n} = q_{g,n-1} \oplus q_\omega \quad (1)$$

where, for a time interval between n–1 and n of T, quaternion $q_\omega$ is:

$$q_\omega = \left[1, \frac{T}{2}\vec{\omega}_n\right] \quad (2)$$

the quaternion multiplication $\oplus$ being well-known in the art.

Method 200 then includes rotating at least one measurement $v_{in}$ (i.e., a vector quantity) from the sensor reference system to the gyroscope reference system using the transformation, at S220. In a mathematical formulation using quaternions, the rotated measurement is:

$$\vec{v}_g = q_{g,n}^* \oplus \vec{v}_{in} \oplus q_{g,n} \quad (3)$$

Method 200 then includes filtering the rotated measurement to remove at least a high-frequency time-dependent portion thereof, at S230, thereby keeping the constant and/or slow time-varying portion. In some cases (e.g., for acceleration), it is desirable to remove the time-dependent portion if the known constant portion (e.g., corresponding to gravity) is retained. A low pass filter or any other suitable filter may be used. In one embodiment, in order to filter a current value, similar measurements (also rotated in the gyroscope reference system) in a filtering window preceding the measurements are analyzed. Each vector component may be filtered separately by a 3-channel gyroscope filter.

Method 200 then includes rotating the filtered measurement back into the sensor reference system at S240. In a mathematical formulation using quaternions, the filtered and rotated back measurement is:

$$\vec{v}_{out} = q_{g,n} \oplus \vec{v}_{g,filtered} \oplus q_{g,n}^* \quad (4)$$

This filtering method may be applied to acceleration (e.g., measured using a 3D accelerometer) and/or to a magnetic field (e.g., measured using a 3D magnetometer). If the filtered measurement is the acceleration, the time-independent portion thereof likely corresponds to gravity, with the time-dependent linear acceleration (i.e., other than gravity) being removed. The time-dependent portion of the acceleration (which can be separated during filtering) may be used to estimate a current linear position of the device. Linear acceleration may also be used by the inertial sensor navigation systems. If the filtered measurement is the magnetic field, the time-independent portion thereof likely corresponds to Earth's magnetic field, with interferences and transitory fields being removed.

When the filtering method is used for acceleration and/or magnetic field, method 200 may further include applying a sensor fusion method to determine the sensor reference system's current orientation relative to the Earth-type reference system, using the filtered and rotated measurement(s) as an input.

Figure 3:
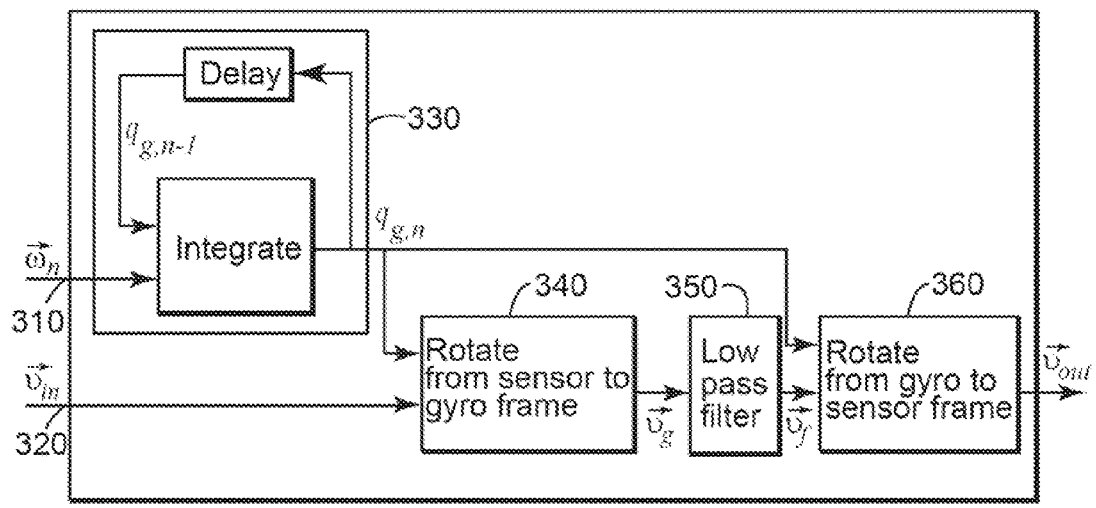
FIG. 3 is a block diagram of a dedicated apparatus according to an embodiment.

FIG. 3 is a block diagram of a filtering module 300 according to an embodiment. Module 300 includes first input 310 configured to receive a current value of an angular velocity $\omega_n$ of a device, and a second input 320 configured to receive a measurement $v_{in}$ (e.g., an acceleration or a magnetic field from sensors mounted on the device).

Module 300 then includes integration unit 330 configured to receive angular velocity $\omega_n$ and to determine a transformation (e.g., quaternion $q_{g,n}$) to be applied to the received measurement. Integration unit 330 may integrate the angular velocity starting from a previous (delayed) angular position $q_{g,n-1}$ to find the current angular position (i.e., quaternion $q_{g,n}$).

First rotation unit 340 that receives the transformation (e.g., quaternion $q_{g,n}$) from integration unit 330 and the measurement from second input 320 applies the transformation to the received measurement, to output transformed measurement $v_g$.

Filter 350 is configured to modify transformed measurement $v_g$ so that the modified measurement $v_f$ represents a substantially time-independent portion of the transformed measurement (e.g., the high frequency part removed).

Second rotation unit 360 that receives the modified measurement $v_f$ and the transformation (e.g., quaternion $q_{g,n}$) applies an inverse of the transformation to the modified measurement and outputs a result $v_{out}$ thereof.

Figure 4:
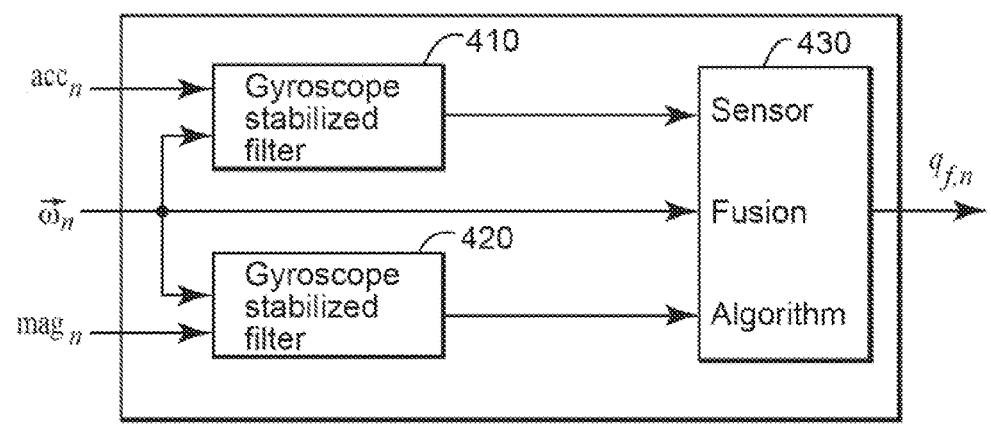
FIG. 4 is an operative diagram of a dedicated device, according to an embodiment.

FIG. 4 illustrates an apparatus 400 according to an embodiment. Apparatus 400 has filtering modules 410 and 420 similar to module 300 in FIG. 3 intercalated to inputs of a module 430 configured to perform sensor fusion. Filtering modules 410 and 420 are configured and connected to filter acceleration and magnetic field measurements. However, measurements corresponding to other quantities having time-invariant portions may be filtered.

Figure 5:
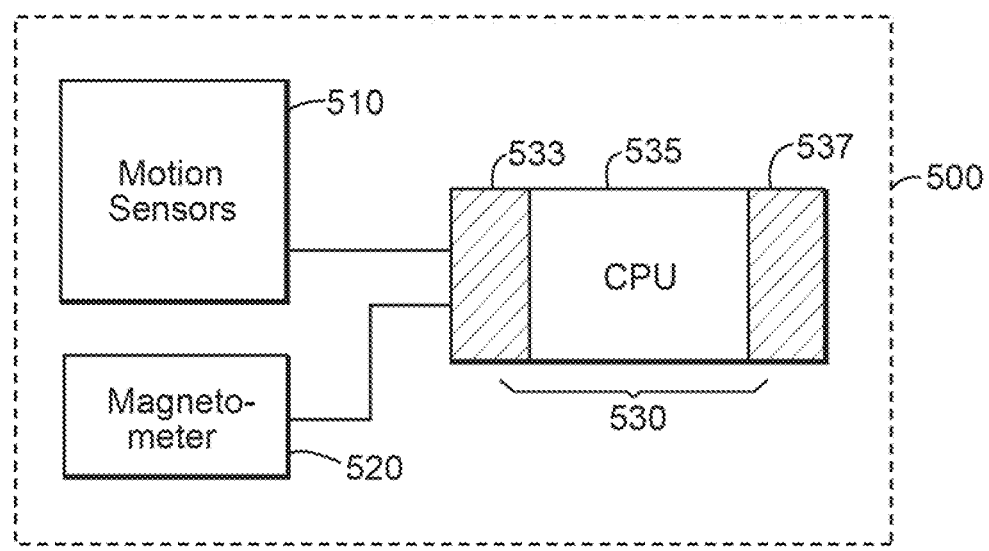
FIG. 5 is a block diagram of a device according to an embodiment.

FIG. 5 illustrates a device 500, according to another exemplary embodiment. Device 500 carries motion sensors 510 and a magnetometer 520. Motion sensors 510, which are configured to measure angular velocity and acceleration, and magnetometer 520 are connected to a dedicated device 530 having an operative structure similar to the one illustrated in FIG. 4. Dedicated device 530 includes an input interface 533, a processor 535 and a memory 537, and is configured to determine orientation of device 500 in a non-inertial (Earth-type) reference system using measurements of motion sensors 510 and magnetometer 520. Memory 530 may non-transitorily store executable codes which, when executed by processor 535, perform any of the above-described methods. Device 500 may be a mobile communication device.

Although the dedicated device 530 is illustrated as a part of device 500, this illustration is not intended to be limiting. In another embodiment, sensor data processing is performed remotely.

According to yet another embodiment, sensor measurements may be converted (i.e., rotated) from the sensor reference system into the estimated Earth-type reference system, and then filtered. The transformation from the sensor reference system to the estimated Earth-type reference system may be determined using the previous fusion quaternion $q_{fusion,n-1}$ determined for a previous measurement modified by integrating the current (measured) angular velocity for the time interval between a previous and a current sample (i.e., set of measurements). A flowchart of a method 600 for filtering, in the estimated Earth-type reference system, a measurement acquired in a sensor reference system is illustrated in FIG. 6.

Method 600 includes determining a transformation from a sensor reference system to an estimated Earth-type reference system using a fusion quaternion determined by applying a fusion method to a set of measurements previously acquired in the sensor reference system and integrating an angular velocity measured in the sensor reference system, at S610. Method 600 further includes rotating at least one measurement from the sensor reference system to the estimated Earth-type reference system using the transformation, at S620. Method 600 then includes filtering the rotated at least one measurement to remove a high-frequency time-dependent portion thereof, at S630, and rotating the filtered at least one measurement back into the sensor reference system, at S640.

The disclosed exemplary embodiments provide a method and a dedicated device for filtering measurements used to determine orientation of a device. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the claimed invention. However, one skilled in the art would understand that various embodiments may be practiced without such specific details. Furthermore, the final output could be used for any reasonable purpose and does not have to relate to orientation. It could be any property or measurement whose measurement is at least partially affected by frame changes such as those resulting from orientation adjustments. Alternate examples might include step length, travelling direction, phone pose, heartbeat signals, tremor, rudder position, door position, etc. Also, while the source of the orientation estimate here is generally the gyroscope, the scope of the invention is not restricted to that sensor. Any sensor that allows one to estimate changes in, e.g., orientation over time could be used to drive this same filtering concept. For example, angular position sensors, some forms of magnetometers and other sensors may be used to determine the transformation from the sensor reference system to the gyroscope (quasi-stationary) reference system.

As also will be appreciated by one skilled in the art, the exemplary embodiments may be embodied in a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories. Accordingly, the exemplary embodiments may take the form of entirely hardware or combine hardware and software aspects.

Although the features and elements of the present exemplary embodiments are described in the embodiments in particular combinations, each feature or element can be used alone without the other features and elements of the embodiments or in various combinations with or without other features and elements disclosed herein.

What is claimed is:

1. A method for filtering a measurement acquired in a sensor reference system, the method comprising:
   determining a transformation from a sensor reference system to a gyroscope reference system;
   rotating at least one measurement from the sensor reference system to the gyroscope reference system using the transformation;
   filtering the rotated at least one measurement to remove at least a high-frequency time-dependent portion thereof; and
   rotating the filtered at least one measurement back into the sensor reference system.

2. The method of claim 1, wherein the transformation is determined using a previous angular position of the gyroscope reference system in the sensor reference system, and an angular velocity measured in the sensor reference system.

3. The method of claim 2, wherein the angular velocity and the at least one measurement are acquired by sensors attached to a device, the sensor reference system being associated to a rigid body of the device.

4. The method of claim 3, wherein the method is performed by a data processing unit of the device.

5. The method of claim 3, wherein the angular velocity is measured by a 3D gyroscope.

6. The method of claim 3, wherein the device is a mobile communication device.

7. The method of claim 1, wherein the at least one measurement corresponds to an acceleration and/or to a magnetic field.

8. The method of claim 7, wherein the magnetic field is measured using a 3D magnetometer.

9. The method of claim 7, wherein the acceleration is measured using a 3D accelerometer.

10. The method of claim 7, wherein one of the at least one measurement corresponds to acceleration and the filtered time-dependent portion thereof is used to estimate a current linear position of the device.

11. The method of claim 7, further comprising:
    applying a sensor fusion method to determine a current orientation of the sensor reference system relative to an Earth-type reference system, using the filtered rotated at least one measurement as an input.

12. The method of claim 11, further comprising:
    displaying an image for a gaming system user according to the current orientation.

13. The method of claim 11, further comprising:
    determining a position of a cursor on a display according to the current orientation.

14. The method of claim 11, wherein the method is performed by a processor of an apparatus controlled based on the current orientation.

15. The method of claim 1, wherein the transformation determined as a quaternion representing angular position of the gyroscope reference system relative to the sensor reference system.

16. A computer readable medium storing executable codes which when performed by a computer make the computer perform a method for filtering a measurement acquired in a sensor reference system, the method comprising:
- determining a transformation from a sensor reference system to a gyroscope reference system using a previous angular position of the gyroscope reference system in the sensor reference system, and an angular velocity measured in the sensor reference system;
- rotating at least one measurement from the sensor reference system to the gyroscope reference system using the transformation;
- filtering the rotated at least one measurement to remove at least a high-frequency time-dependent portion thereof; and
- rotating the filtered at least one measurement back into the sensor reference system.

17. A filtering module, comprising:
- a first input configured to receive a current value of an angular velocity of a device;
- a second input configured to receive a measurement of an acceleration or a magnetic field from sensors mounted on the device;
- an integration unit configured to receive the angular velocity and to determine a transformation to be applied to the received measurement;
- a first rotation unit configured to receive the transformation and to apply the transformation to the received measurement;
- a filter configured to modify the transformed measurement, so that the modified measurement to correspond to a substantially time-independent portion; and
- a second rotation unit configured to receive the transformation, to apply an inverse of the transformation to the modified measurement and to output a result thereof.

18. A method for filtering a measurement acquired in a sensor reference system, the method comprising:
- determining a transformation from a sensor reference system to an estimated Earth-type reference system using a fusion quaternion determined by applying a fusion method to a set of measurements previously acquired in the sensor reference system and integrating an angular velocity measured in the sensor reference system;
- rotating at least one measurement from the sensor reference system to the estimated Earth-type reference system using the transformation;
- filtering the rotated at least one measurement to remove a high-frequency time-dependent portion thereof; and
- rotating the filtered at least one measurement back into the sensor reference system.

* * * * *